(No Model.)

J. H. LANGTON.
STAKE OR POST BASE.

No. 531,196. Patented Dec. 18, 1894.

WITNESSES.
Benjamin F. Wilcox.
Alfred L. Phillips

INVENTOR.
James H. Langton.
By Lucius C. West,
atty.

UNITED STATES PATENT OFFICE.

JAMES H. LANGTON, OF CENTREVILLE, MICHIGAN.

STAKE OR POST-BASE.

SPECIFICATION forming part of Letters Patent No. 531,196, dated December 18, 1894.

Application filed May 16, 1894. Serial No. 511,468. (No model.)

*To all whom it may concern:*

Be it known that I, JAMES H. LANGTON, a citizen of the United States, residing at Centreville, in the county of St. Joseph and State of Michigan, have invented a new and useful Stake or Post-Base, of which the following is a specification.

The object of this invention is to construct a radially winged metal stake or post-base which can be easily driven into, and withdrawn from, frozen ground, and hard or stony ground whether frozen or not, and as a matter of course may be used in mellow ground, and which stake or post-base has a large amount of surface for contacting with the ground, disposed in a manner to withstand canting and twisting strains upon it.

To this end the invention consists in a stake or post-base having a polygonal central body provided with radial wings on a portion of its sides, all the thicknesses and surfaces of the body and wings tapering from the upper to the lower end, and the thickness of said wings also tapering from the body to the outer edge.

Figure 1:
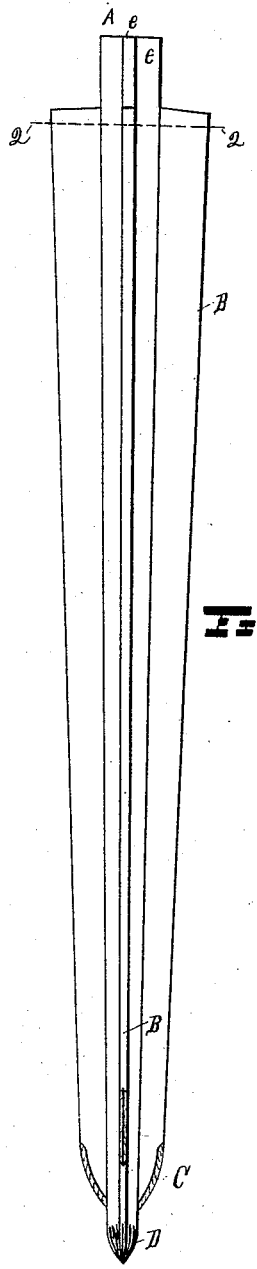
Figure 3:
Figure 2:

In the drawings forming a part of this specification Figure 1, is a side elevation; Fig. 2, a perspective view showing a change in the wings from Fig. 1; and Fig. 3, is a cross section on line 2—2 in Fig. 1, looking from a point above.

Referring to the lettered parts of the drawings, A is the central body, which is here shown eight sided, but it may have a greater or less number of sides, although eight are preferred. It will be observed that the surfaces of these sides e, taper from the upper to the lower end, thus making the body tapering and smallest at the lower end. Four wings B, are here shown, radiating from four of the sides e; but while this number of wings are preferred, they may be increased or diminished in number, the proportionate number of sides being made to correspond. The surfaces of the wings B, taper from the upper to the lower end, including both the side and edge surfaces, thus making the wings narrower and thinner toward the lower end. The thickness of the wings B, also taper from the central body A, to their outer edge. The lower ends of the wings B, are rounded off from their outer edge to the body, and chamfered to an edge as at C. These wings B, may all terminate at a like distance above the lower end D, of the body, as in Fig. 2, or some of them may be shorter than others with which they alternate thus terminating at different distances above the end D, as in Fig. 1, which latter plan is preferred since they do not have to enter the ground all at once.

The lower end D, of the body is sharpened to a point.

The body A, projects above the upper end of the wings B, thus forming a head to pound on in driving the stake, or a projection to attach a post to when using the stake as a post-base. This head or upper projection may be varied in shape as desired according to the use the stake is put. The body A, and wings B, enter the ground in a wedging manner, compressing the displaced matter between the wings thus driving easier and being less liable to cant or turn than a solid stake of a diameter equal to the distance from the edge of one wing to the edge of another directly opposite.

The invention employed in the capacity of stakes will be found of especial utility in anchoring sawing machines, thrashing machines, horse powers, engines, and the like, when the ground is frozen; also for fastening the stay ropes of tents, and for other purposes.

Any suitable plan may be adopted for attaching the stakes to posts when using them as post-bases.

I am aware that stakes have heretofore been made having a central body provided with radial wings. Hence I do not claim these features *per se*.

Having thus described my invention, what I claim as new, and desire to secure by Letters Patent of the United States, is—

A stake or post-base, comprising a polygonal body portion provided on its alternating sides with radial wings, the other alternating sides of the body being exposed between the wings throughout the length of the stake, said exposed surfaces between said wings tapering from the upper to the lower end of the stake, the entire vertical width and thickness of said wings also tapering from the upper to the lower end of the stake, and the entire horizontal thickness of the wings tapering from the sides of the body to the outer edge of the wings, substantially as set forth.

In testimony of the foregoing I have hereunto subscribed my name in the presence of two witnesses.

JAMES H. LANGTON.

Witnesses:
BENJAMIN F. WILCOX,
RUFUS POWERS.